United States Patent
Rogalski et al.

(10) Patent No.: US 7,386,319 B2
(45) Date of Patent: Jun. 10, 2008

(54) SYSTEM AND METHOD FOR TWO-WAY MESSAGING BETWEEN A PERSONAL COMPUTER AND A CORDLESS DEVICE INCLUDING STEREO

(75) Inventors: Gary Rogalski, Richmond (CA); Wendy Brown, Hackettstown, NJ (US)

(73) Assignee: VTech Telecommunications Limited, Tai Po, New Territory (HK)

( * ) Notice: Subject to any disclaimer, the term of this patent is extended or adjusted under 35 U.S.C. 154(b) by 330 days.

(21) Appl. No.: 10/401,760

(22) Filed: Mar. 31, 2003

(65) Prior Publication Data

US 2004/0132468 A1 Jul. 8, 2004

Related U.S. Application Data

(60) Provisional application No. 60/438,527, filed on Jan. 8, 2003.

(51) Int. Cl.
*H04Q 7/20* (2006.01)
(52) U.S. Cl. .............. 455/466; 455/420; 455/462; 455/412.1
(58) Field of Classification Search .......... 455/466, 455/420, 556.1, 556.2, 557, 413, 462, 561, 455/464, 66.1, 412.1; 379/90.01, 88.13, 379/88.17
See application file for complete search history.

(56) References Cited

U.S. PATENT DOCUMENTS

| | | | | |
|---|---|---|---|---|
| 4,908,828 A | * | 3/1990 | Tikalsky | 714/822 |
| 5,031,206 A | * | 7/1991 | Riskin | 379/93.27 |
| 5,703,934 A | * | 12/1997 | Zicker et al. | 455/462 |
| 5,903,632 A | * | 5/1999 | Brandon | 379/93.23 |
| 6,289,213 B1 | * | 9/2001 | Flint et al. | 455/420 |
| 6,546,090 B1 | * | 4/2003 | Bremer et al. | 379/93.08 |
| 6,630,883 B1 | * | 10/2003 | Amin et al. | 340/7.29 |
| 6,807,564 B1 | * | 10/2004 | Zellner et al. | 709/206 |
| 2001/0001610 A1 | * | 5/2001 | McElvaney | 370/463 |
| 2002/0068600 A1 | * | 6/2002 | Chihara et al. | 455/550 |
| 2003/0023694 A1 | * | 1/2003 | Macor | 709/206 |
| 2003/0083099 A1 | * | 5/2003 | Steinbach et al. | 455/557 |

FOREIGN PATENT DOCUMENTS

| | | | |
|---|---|---|---|
| FR | 002727812 A1 | * | 6/1996 |
| JP | 403145698 A | * | 6/1991 |

* cited by examiner

*Primary Examiner*—Melur Ramakrishnaiah
(74) *Attorney, Agent, or Firm*—Paul Hastings Janofsky & Walker, LLP

(57) ABSTRACT

Text messages are communicated between a personal computer and a cordless device having a base unit and a handset. Text messages sent from the personal computer to the handset are displayed on a text screen on the handset. Text message sent from the handset to the personal computer are displayed on a text window on the personal computer. Messages can be passed from the personal computer to a base unit of the cordless device using an analog or a digital interface. In addition, stereo music is transmitted from a stereo source to the handset through the base unit.

22 Claims, 7 Drawing Sheets

SYSTEM AND METHOD FOR TWO-WAY MESSAGING BETWEEN A PERSONAL COMPUTER AND A CORDLESS DEVICE INCLUDING STEREO

The present application claims the benefit of U.S. Provisional Application No. 60/438,527, filed Jan. 8, 2003, which is hereby incorporated by reference herein in its entirety.

BACKGROUND

1. Field of the Invention

Embodiments of the present invention relate generally to the field of communications. More particularly, the present invention relates to expanding communication capabilities using personal computers and cordless devices.

2. Background of the Invention

Two-way messaging systems are in common use today. Many such systems, such as instant messaging (IM) systems are personal computer (PC)-based. One drawback of such PC-based systems is that the user is tethered to the PC for the entire duration of the IM session. Another drawback is a lack of privacy with PC-based systems. One reason for this lack of privacy, for example, is that PC's are often centrally located in homes and set up in ways that preclude privacy.

Cordless telephone devices provide a degree of freedom from tethered communications. In addition, cordless telephone devices provide privacy in communications. However, such cordless telephone devices cannot be used for instant messaging purposes. One reason is that conventionally, such cordless telephone devices cannot be coupled to a PC-based messaging client, such as an instant messaging client.

BRIEF SUMMARY OF THE INVENTION

Embodiments of the present invention allow PC-based IM clients to be run on a cordless device without requiring the central office to support any form of messaging. Another aspect of the present invention provides an air interface between the cordless base and handset that facilitates normal full-duplex speech, two-way text messaging data with the ability to also send HiFi stereo sound from the base unit to the handset.

In one embodiment, the present invention is a system for communicating text messages. The system includes a personal computer on which a text message is generated. A second personal computer receives the text message. An interface on the second personal computer is used to transmit the text message to a cordless device coupled to the interface. The cordless device receives the transmitted text message from the interface. The text message is displayed on a text window associated with the cordless device.

In another embodiment, the present invention is a method for communicating a text message. The method comprises generating the text message, transmitting the text message to a device coupled to a cordless device, the cordless device having a base station and an associated handset and displaying the text message in a text message screen on the handset.

DETAILED DESCRIPTION OF THE INVENTION

Figure 1:
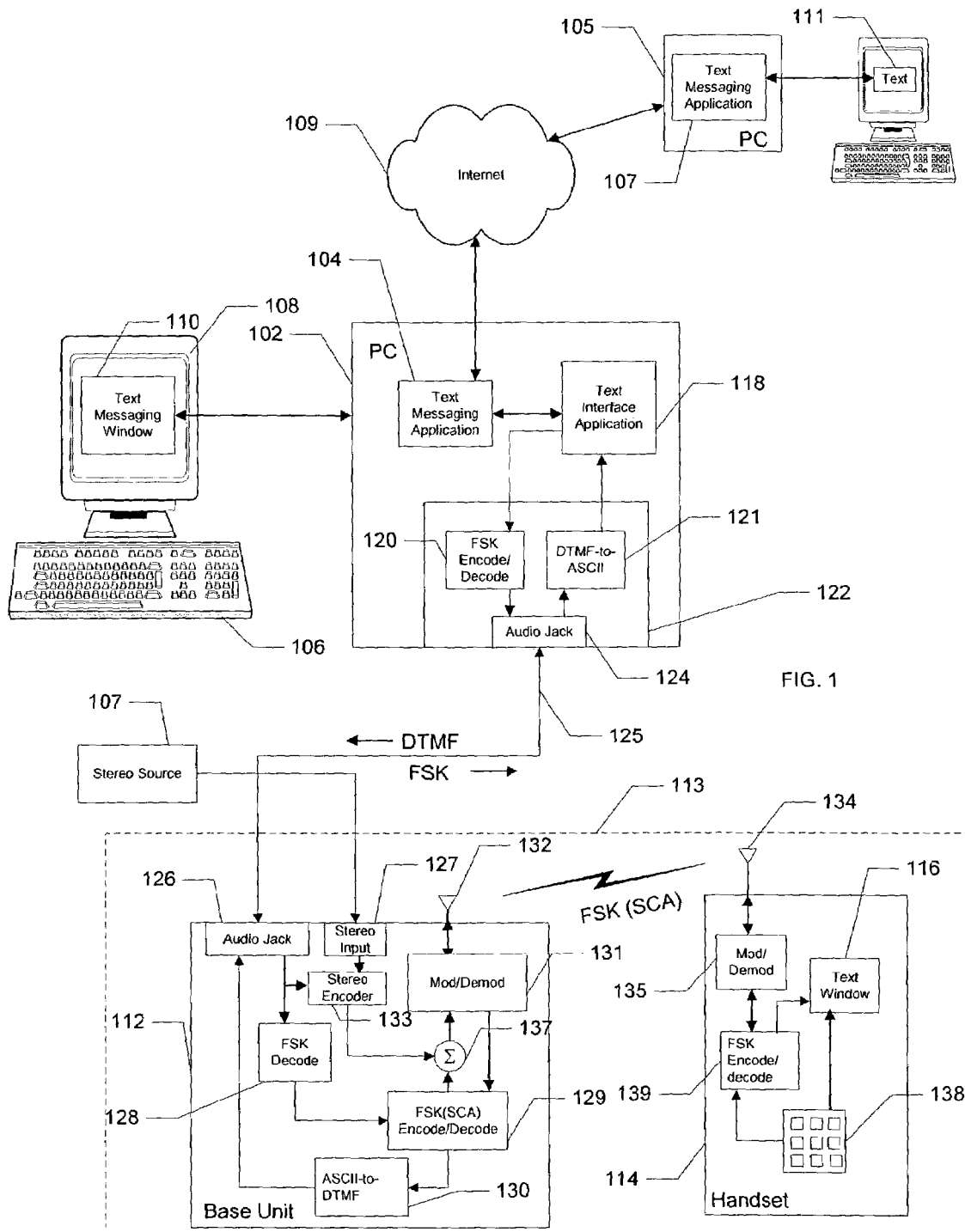
FIG. 1 is a schematic diagram of a system for communicating text messages between a personal computer and a cordless device according to an embodiment of the present invention.

FIG. 1 is a schematic diagram of a system for communicating text messages between a personal computer (PC) 102 and a cordless device 113 according to an embodiment of the present invention. Cordless device 113 includes a base unit 112 and a handset 114. Handset 114 includes a text window 116 in which text can be displayed.

PC 102 has a text messaging application 104 executing thereon. An exemplary text messaging application 104 is well known instant messaging (IM). Text messaging application 104 controls entry and display of text in one or more applications using PC 102. For example, text can be entered for display into a text messaging window 110 from text entered into a remote text messaging window 111. Remote computer 105 can execute a remote text messaging application 107. Remote text messaging application 107 can be similar in function to text messaging application 104. For example, remote text messaging application 107 can capture a text message entered into text messaging window 111 and forward it to text messaging application 104 to be entered into text messaging window 110. Remote text messaging application 107 can communication with text messaging application 104 over a network such as the Internet 109.

PC 102 is in communication with base unit 112 of a cordless device 113 via an analog interface 125. According to embodiments of the present invention, text messages are sent from PC 102 to cordless device 113 for display in a text window 116 of handset 114 and from handset 114 to PC 102 for display in a remote text messaging window 111. For example, such a remote text messaging window can be controlled by remote text messaging application 107 executing on remote computer 105.

Embodiments of the present invention provide a text interface application 118 executing PC 102 that links into text messaging application 104. Text interface application 118 provides a seamless interface into text messaging application 104 that can capture text coming into text messaging application 104. For example, text interface application 118 can capture text received and displayed in text messaging window 110 from remote text messaging application 107. Text messaging interface application 118 can and transmit the captured text to handset 114 for display in text window 116.

To send text messages to handset 114 in one embodiment of the present invention text interface application 118 captures a text message from text window 110. Text interface application 118 captures the text message and forwards it to an FSK encoder tool 120. FSK encoder tool 120 can be a software process executing on PC 102. The text message can be FSK encoded in accordance with a standard Telcordia compliant caller ID (CID) format. As shown in FIG. 1, FSK encoder tool 120 can be located on a sound card 122 that is located in PC 102. The FSK-encoded analog text is sent out of an audio output of an audio jack 124 on sound card 122.

The audio output of audio jack 124 is coupled to an audio input of an audio jack 126 over analog interface 125. Audio jack 126 is located in base unit 112 of cordless device 113. The encoded text is decoded in an FSK encoder/decoder 128 located in base unit 112. In one embodiment of the present invention, FSK encoder/decoder 128 is a conventional caller ID (CID) FSK modem (e.g., one such as found in many conventional cordless telephone base units). Use of the phone's native CID FSK decoder eliminates the need for additional decoding hardware thereby reducing development costs.

Figure 5:
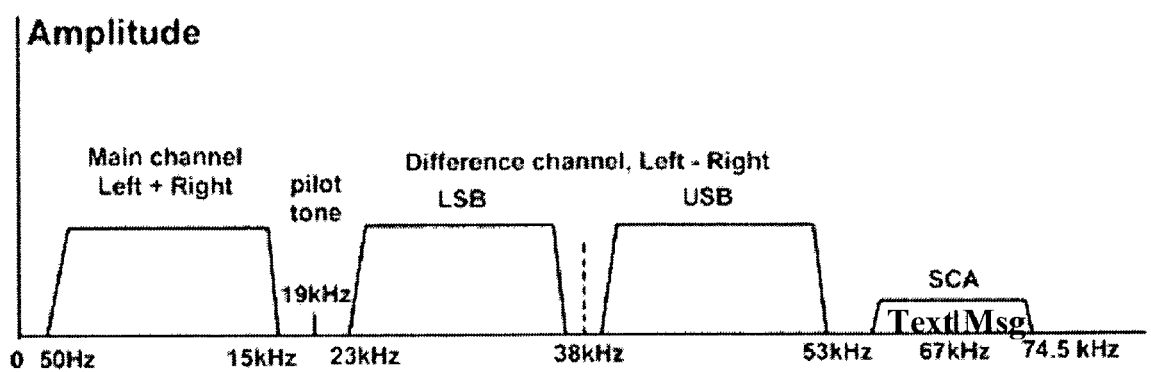
FIG. 5 is a diagram of an exemplary FM multiplex bandwidth that can be used for transmitting voice, data and stereo according to an embodiment of the present invention.

The decoded text is then reconstituted and encoded onto an SCA channel using FSK modulation. The SCA channel is centered at 67 kHz. The SCA channel is located in a portion of the frequency band that is higher than that used for other signals such as voice and Hi-Fi stereo. Consequently, the text message data can be transmitted on the SCA channel without interfering with such voice or stereo. An exemplary spectral architecture for transmitting the data is described later with respect to FIG. 5. The baseband signal (including the FSK text message data on the SCA channel) shown in FIG. 5 is modulate to an RF frequency by a modulator demodulator 131 for transmission. The modulated signal is then transmitted to handset 114 through an antenna 132.

An antenna 134 on handset 114 receives the transmitted RF signal. The received RF signal is demodulated to baseband by a modulator/demodulator 135. An FSK encoder/decoder 139 decodes the encoded text message from the SCA channel in the baseband signal back to ASCII text. The text is then displayed to a user on text window 116 of handset 114.

Text messages can also be transmitted from handset 114 to PC 102 for display in remote text messaging window 111. This is done by generating a message in text window 116 that is sent to text messaging window 110. Text messaging application 104 can then capture the message and forward it to text messaging window 111 in a conventional manner.

In embodiments of the present invention, a message is entered using a keyboard 138 on handset 114. The entered message appears in text screen 116. The text message is encoded on the SCA channel by FSK encoder/decoder 139. The FSK (SCA) signal is incorporated into the spectral structure shown in FIG. 5. This baseband signal is modulated to an RF frequency by modulator demodulator 135 for transmission. The RF signal is transmitted to base unit 112 through antenna 134 on handset 114. Antenna 132 on base unit 112 receives the signal and forwards it to modulator/demodulator 131. Modulator/demodulator 131 demodulates the RF signal to baseband. The baseband signal is forwarded to an FSK (SCA) encoder/decoder 129. FSK (SCA) encoder/decoder 129 converts the FSK signal back to ASCII text. The ASCII text is then converted to DTMF tones by DTMF generator 130. Conventional CID systems use DTMF signaling, so there exists a defined standard for encoding ASCII characters using DTMF. For example, systems outside North America use such DTMF signaling.

The resulting DTMF tones embodying the text message are sent to an audio input of audio jack 124 through an audio output of audio jack 126 over analog interface 125. The digital version of the DTMF tones are decoded to ASCII text by a DTMF-to-ASCII conversion tool 121. DTMF-to-ASCII conversion tool 121 can be a software process executing on PC 102. As shown in FIG. 1, DTMF-to-ASCII conversion tool 121 can be located on sound card 122. The resulting ASCII text is sent to text interface application 118. Text interface application 118 reformats the text into a format appropriate for insertion into text messaging application 104. Text messaging application 104 then displays the text in text messaging window 110. Text messaging application 104 then captures the text and forwards it for display in remote text messaging window 111 in a conventional manner.

Messaging systems, such as instant messaging systems, generally provide the entire conversation in the text window. That is, locally entered text, for example text entered using a keyboard 138 is also displayed in text window 116. In this manner, the entire conversation can be captured in text window 116.

In addition, in embodiments of the present invention, no text display window 110 is displayed. This is accomplished by modifying text messaging application 104 to perform the above described function without the additional step of displaying text messaging window 110.

In addition, stereo information can be included in the signal transmitted to the handset. The stereo source can be either personal computer 102 or a separate stereo source 107. Where the stereo source is the PC, the stereo information is transmitted to base unit 112 over analog interface 125. Where the stereo information is from an separate stereo source 107, the stereo information enters base station 112 through a stereo input 127. The stereo information is FSK encoded into an appropriate spectral structure for transmission to handset 114 in stereo encoder 133. Such an appropriate spectral structure is described in FIG. 5. The encoded stereo information is combined with FSK-encoded text message data in a combiner 137. The combined data is passed to a modulator where it is modulated to an RF frequency for transmission to handset 114.

The interface between the PC and the cordless device can be implemented in several ways. The most cost-effective implementation is believed to be an audio interface such as audio interface 125 described above that is implemented by using the phone's built-in CID FSK decoder. Other interfaces are also possible according to embodiments of the present invention.

Figure 2:
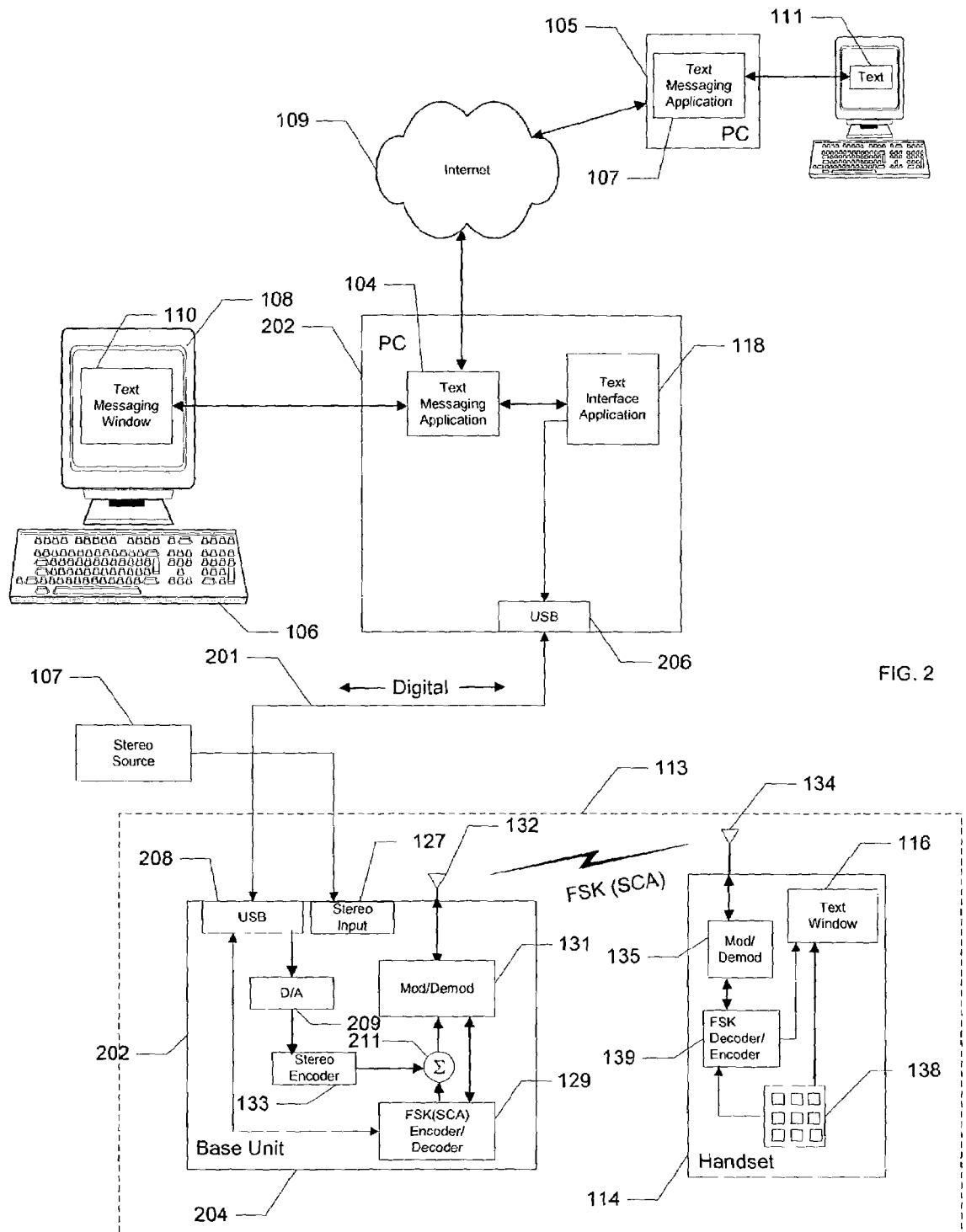
FIG. 2 is a schematic diagram of a system for communicating text messages between a personal computer and a cordless device according to another embodiment of the present invention.

For example, in another embodiment of the present invention, the interface between the PC and the cordless device is a digital interface. An exemplary digital interface is a USB port. An embodiment of the present invention using a digital interface 201 between a PC 202 and base unit 204 is shown by the schematic diagram of FIG. 2. As shown in FIG. 2, a digital interface 201 couples a universal serial bus (USB) port 206 on PC 202 to a similar USB port 208 on base unit 204 over digital interface 201.

Text is entered in text messaging window 110. For example, such text can be from a remote messaging application 107. The digital data corresponding to the ASCII text message is received at USB port 208 and forwarded to FSK (SCA) encoder/decoder 129. FSK encoder/decoder encodes the ASCII data of the text message on the SCA channel. The data is then transmitted through antenna 132 of base unit 204 to antenna 134 of handset 114. The received FSK-encoded text message is decoded in FSK encoder/decoder 139 back to ASCII text. The ASCII text is displayed on text window 116.

To send a text message from handset 114 to remote computer 105 for display in remote text messaging window 111, the text is entered via keypad 138 of handset 114. The text is shown in text window 116 and also FSK-encoded onto the SCA channel by FSK (SCA) encoder/decoder 139. The FSK-encoded text is modulated to an RF frequency by modulator/demodulator 135 for transmission through antenna 134 of handset 114 to antenna 132 of base unit 202. Antenna 132 receives the FSK-encoded text and forwards it to a modulator/demodulator 131 to be converted to baseband. The baseband signal is passed through FSK (SCA) encoder/decoder 129. FSK (SCA) encoder/decoder 129 decodes the FSK-encoded text back to ASCII and forwards it to USB port 208. USB port 208 transmits the ASCII data over digital interface 201 where it is received by USB port 206 on PC 202. The ASCII data of the text message is forwarded to text interface application 118 where it is inserted into text messaging application 104 and displayed on text messaging window 110. Text messaging application 104 captures the text message and forwards it for display in remote text messaging window 111 in a conventional manner. Other digital interfaces, such as parallel interfaces can also be used. As described above, the text messaging application can be adapted to display the entire conversation in text window 116. Further as described above, text messaging application 104 can be adapted so that no text window 110 is displayed in embodiments of the present invention.

In addition, stereo information can be included in the signal transmitted to the handset. The stereo source can be either personal computer 102 or a separate stereo source 107. Where the stereo source is the PC, the stereo information is transmitted to base unit 112 over digital interface 201 and converted to an analog form in a D/A converter 209. Where the stereo information is from an separate stereo source 107, the stereo information enters base unit 112 through a stereo input 127. The stereo information is FSK encoded into an appropriate spectral structure for transmission to handset 114 in stereo encoder 133. Such an appropriate spectral structure is described in FIG. 5. The encoded stereo information is combined with FSK-encoded text message data in a combiner 211. The combined data is passed to a modulator where it is modulated to an RF frequency for transmission to handset 114.

Adding a digital interface 201, such as a USB port, simplifies the system in that there is no special DTMF/FSK encoding/decoding (as described above) required. However, adding the digital interface 201 generally increases the cost of the cordless base unit due to the additional hardware costs associated with the digital equipment. For example, the additional hardware costs are associated with adding the digital connection because such a connection is not native to the cordless device.

Another advantage of the digital interface aside from the simplified implementation is the ability to simultaneously transmit stereo and the text message when the PC itself is used as the stereo sound source. In some embodiments of the invention, this cannot be done using the analog interface because the text message in the analog embodiment is FSK encoded into the voice band, for example, using a standard FSK CID format as described above. Thus, the spectra of the stereo and the FSK-encoded text message would overlap. Use of the digital interface avoids such spectral overlap.

Figure 3:
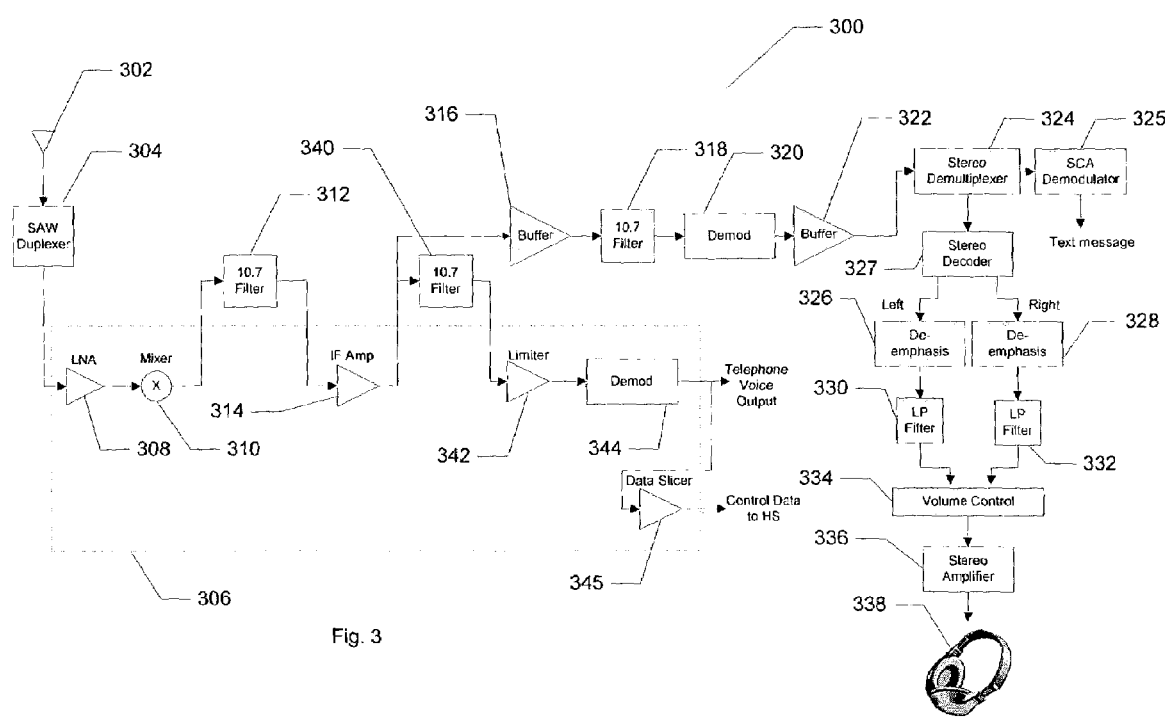
FIG. 3 is a schematic diagram of an exemplary handset receiver that can be used according to an embodiment of the present invention.

FIG. 3 is a schematic diagram of an exemplary handset receiver 300 that can be used in a handset such as handset 114 according to an embodiment of the present invention. Receiver 300 is located in a cordless telephone handset. A signal is received (from an associated base station) by an antenna 302 and transmitted through a surface acoustic wave (SAW) duplexer 304 to a demodulator 306.

Demodulator 306 includes a low noise amplifier 308 that amplifies the signal for mixing in a mixer 310. Mixer 310 mixes the signal with a reference to bring the signal to the 10.7 MHz intermediate frequency. A filter 312 band pass filters the output of mixer 310 to filter out undesired byproducts in the output of mixer 310. The signal is then amplified by amplifier 314 for further processing.

The signal then follows two paths. The signal can pass through a buffer 316 that isolates the impedance of filters 318 and 340. The signal is also filtered by a filter 318. Filter 318 passes the stereo and text message information of the signal. For example, filter 318 can be centered at 10.7 MHz with a pass band of 150 kHz. The stereo and text message information of the signal is described later with respect to the FM multiplex format illustrated in FIG. 5. The stereo and text message information in the FM signal is demodulated in demodulator 320 and buffered in a buffer 322. A stereo demultiplexer 324 extracts the left and right channel stereo information from the demodulated signal. The left and right channel stereo information is separated by a stereo decoder 327. The left channel information is passed through a de-emphasis process 326 and a low pass filter 330 to cut off frequencies above approximately 15 KHz. The right channel information is passed through a de-emphasis process 328 and a low pass filter 332 to cut off frequencies above approximately 15 KHz. The left and right channel information signal is passed through volume control 334 and amplified in stereo amplifier 336. The signal is then played through a speaker, for example, headphones 338.

An SCA channel demodulator 325 demodulates the demultiplexed signal output from stereo demultiplexer 324 to extract the text message from the SCA channel. The extracted text message can then be displayed on a text screen located on the handset.

The processing from buffer 316 through amplifier 336 shown in FIG. 3, and described above, can be used to process voice information as well. However, better performance can be achieved by processing voice in a secondary path optimized for voice processing. Such a secondary path is shown in FIG. 3. In the secondary path, the signal is filtered through filter 340 to pass only speech information. For example, filter 340 can be centered at 10.7 MHz with a pass band of 110 kHz. This effectively passes the voice information but cuts off the SCA channel and stereo information. The filter voice signal is limited in limiter 342 and demodulated in demodulator 344. Demodulator 344 also has a narrower bandwidth to improve performance in voice processing. Using the narrower bandwidths for processing the voice reduces noise, thereby improving the performance of the system for voice. The voice signal is then passed to a telephone. A data slicer 345 is used to extract in-band control information for the handset.

Figure 3A:
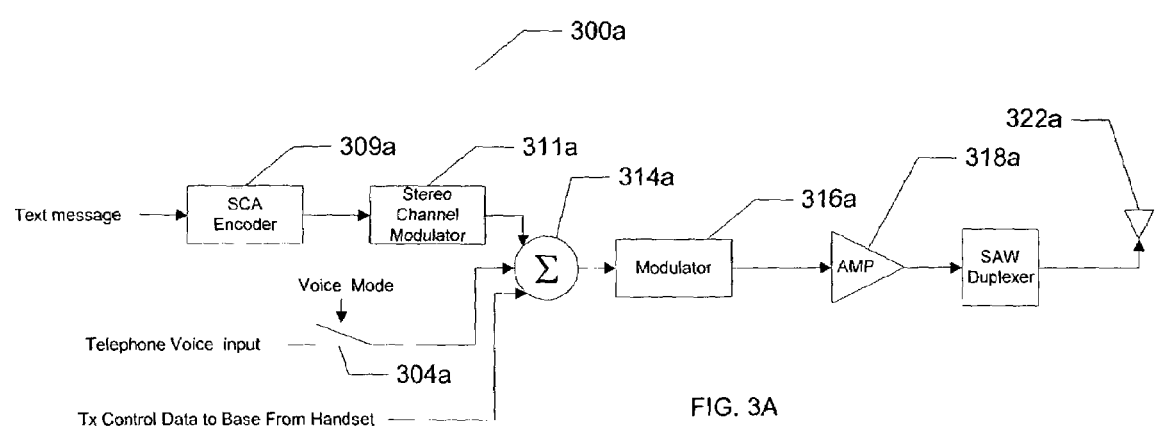
FIG. 3A is a schematic diagram of an exemplary handset transmitter that can be used according to an embodiment of the present invention.

FIG. 3A is a schematic diagram of an exemplary handset transmitter 300a that can be used in a handset such as handset 114 according to an embodiment of the present invention. Transmitter 300a is located in a handset of a cordless device. If voice mode is selected, telephone voice information is transferred to summer 314a through switch 304a. The signal is summed along with control information to be transmitted from the base unit to the handset.

The text message that is created for example using a keypad on the handset is FSK encoded in an SCA encoder 309a and modulated to the SCA channel in an SCA modulator 311a in preparation to be modulated to an RF frequency for transmission to the base station.

Summer 314a combines the telephone voice and in-band control data with the text message that has been modulated onto the SCA channel. The combined signal is modulated in modulator 316a to an RF frequency and amplified for transmission in amplifier 318a. The amplified RF signal is transmitted through a SAW duplexer 320a antenna 322a. For example, the signal is transmitted to a receiver in a cordless device base station such as a base station receiver 400a described below.

Figure 4:
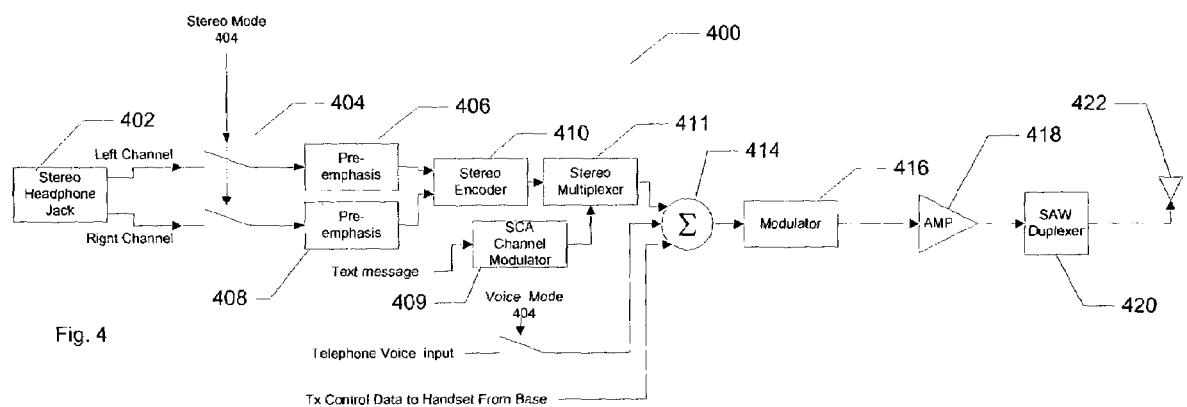
FIG. 4 is a schematic diagram of an exemplary base unit transmitter that can be used according to an embodiment of the present invention.

FIG. 4 is a schematic diagram of an exemplary base unit transmitter 400 that can be used in a base unit such as base unit 112 according to an embodiment of the present invention. Transmitter 400 is located in a base station of a cordless device. Stereo (right channel and left channel information) is played through a headphone jack 402 through a switch 404. Switch 404 switches between stereo mode and voice mode. Voice and stereo occupy overlapping bandwidth at baseband and cannot be sent together. If stereo mode is selected, the stereo signal is passed through pre-emphasis processors 406 and 408. Pre-emphasis is performed on the left and right channels in pre-emphasis processors 406 and 408 respectively. The left and right channel information is combined in stereo encoder 410 and the signal is forwarded to summer 414. If voice mode is selected, telephone voice information is transferred to summer 414 through switch 404. In either case, the signal is summed along with control information to be transmitted from the base unit to the handset.

The text message that is created for example using a keypad on the handset is modulated to the SCA channel in an SCA modulator 409. A stereo multiplexer 411 multiplexes the text message in the SCA channel with the stereo signal output by stereo encoder 410 in preparation to be modulated to an RF frequency for transmission to the base station. For example, the signal resulting from the multiplexing can have the spectral architecture shown in FIG. 5.

Summer 414 combines the stereo information, telephone voice and in-band control data. As described above, only one of the voice or stereo information is forwarded to summer 414 due to the operation of switch 404. The combined signal is modulated in modulator 416 to an RF frequency and amplified for transmission in amplifier 418. The amplified RF signal is transmitted through a SAW duplexer 420 antenna 422. For example, the signal is transmitted to a receiver in a cordless device handset such as receiver 300 described above.

Figure 4A:
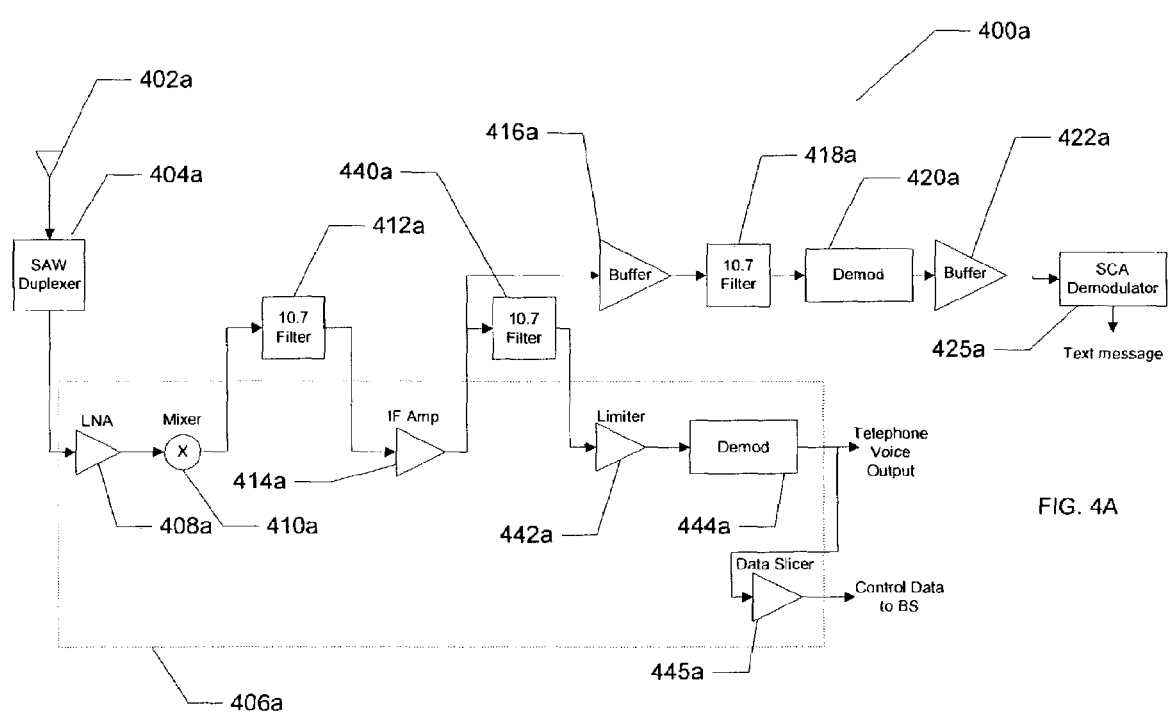
FIG. 4A is a schematic diagram of an exemplary base unit receiver that can be used according to an embodiment of the present invention.

FIG. 4A is a schematic diagram of an exemplary base unit receiver 400a that can be used in a base unit such as base unit 112 for receiving stereo music over a cordless device air interface to a speaker according to an embodiment of the present invention. Receiver 400a is located in a cordless telephone base station. A signal (from an associated handset) is received by an antenna 402a and transmitted through a surface acoustic wave (SAW) duplexer 404a to a demodulator 406a.

Demodulator 406a includes a low noise amplifier 408a that amplifies the signal for mixing in a mixer 410a. Mixer 410a mixes the signal with a reference to bring the signal to the 10.7 MHz intermediate frequency. A filter 412a low band pass filters the output of mixer 410a to filter out undesired byproducts in the output of mixer 410a. The signal is then amplified by amplifier 414a for further processing.

The signal then follows two paths. The signal can pass through a buffer 416a that isolates the impedance of filters 418a and 440a. The signal is also filtered by a filter 418a. Filter 418a passes the text message portion of the signal. For example, filter 418a can be centered at 10.7 MHz with a pass band of 150 kHz. The text message portion of the FM signal is demodulated in demodulator 420a and buffered in a buffer 422a.

An SCA channel demodulator 425a demodulates the demultiplexed signal output from buffer 422a to extract the text message from the SCA channel. The extracted text message can then be forwarded to a PC for transmission to a remote text messaging application. The remote text messaging application can then display the text message in a remote text messaging window.

The processing from buffer 416a through amplifier 422a shown in FIG. 4A, and described above, can be used to process voice information as well. However, better performance can be achieved by processing voice in a secondary path optimized for voice processing. Such a secondary path is shown in FIG. 4A. In the secondary path, the signal is filtered through filter 440a to pass only speech information. For example, filter 440a can be centered at 10.7 MHz with a pass band of 110 kHz. This effectively passes the voice information but cuts off the SCA channel. The filter voice signal is limited in limiter 442a and demodulated in demodulator 444a. Demodulator 444a also has a narrower bandwidth to improve performance in voice processing. Using the narrower bandwidths for processing the voice reduces noise, thereby improving the performance of the system for voice. The voice signal is then passed to a telephone. A data slicer 445a is used to extract in-band control information for the handset.

In an embodiment of the present invention, the air interface between the cordless base unit and the cordless handset is an analog FM system operating at either 900 MHz or 2.4 GHz. This architecture allows mono audio (for straight voice telephony), wideband stereo audio (for remote listening of music files stored on the PC) and two-way data exchange to facilitate text messaging. In one embodiment of the present invention this is achieved using an FM multiplex format. One such format, that is similar to that used for FM broadcast radio is illustrated in FIG. 5. Text messaging data is encoded on the SCA channel that is defined in the FM multiplex format.

In the architecture shown in FIG. 5, since the audio spectrum up to 15 KHz is used for both music and for voiceband telephony (up to approximately 3 KHz only for telephony), simultaneous analog voice telephony and music distribution is not possible. Since the SCA channel is higher in frequency and completely independent, there is no conflict in terms of operation with text messaging. Consequently, voice and data can be sent simultaneously. In addition, stereo and data can be sent simultaneously. A further enhancement to this system is to use a fully digital high speed data link. Such a link (i.e., Home RF or Bluetooth) has the advantage of being able to support telephony, music and text messaging simultaneously. The digital link implementation, however is likely more expensive to implement.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A cordless telephone for carrying out a two-way text messaging session, comprising:
    a base unit, comprising:
        a base unit data connector coupled to a personal computer;
        a first base unit data converter for converting a first text message received from the base unit data connector for wireless transmission;
        a base unit transmitter for transmitting the converted first text message over the wireless data link to a handset associated with the base unit; and
    one or more handsets associated with the base unit, each handset, comprising:
        a handset receiver to receive the converted first text message;
        a first handset data converter to convert the converted first text message to a form suitable for display;
        a display for displaying the displayable form of the converted first text message;
        an interface displayed on the display for allowing the user to enter the second text message, which is displayed on the display; and
        a second handset data converter to convert the second text message to a form suitable for transmission to the base unit; and
        a handset transmitter to transmit the converted second text message to the base unit over the wireless data link; and
    wherein the base unit further includes:
        a base unit receiver for receiving the converted second text message; and
        a second base unit data converter for converting the converted second text message for transmission to the personal computer through the base unit data connector.

2. The cordless telephone recited in claim 1, wherein the first text message is received from the personal computer in analog form.

3. The cordless telephone recited in claim 2, wherein the first base unit data converter receives the first text message from the personal computer in FSK-encoded forms, decodes the received FSK-encoded text message, and reconstitutes the decoded text message to an FSK format for transmission in an SCA channel to generate the first converted text message.

4. The cordless telephone recited in claim 2, wherein the converted second text message is FSK-encoded, and wherein the second base unit data converter receives the FSK-encoded text message from the base unit receiver, decodes the FSK-encoded message to ASCII format, and converts the ASCII format of the text message to DTMF for transmission to the personal computer.

5. The cordless telephone recited in claim 2, wherein the handset receiver is configured to receive stereo information is along with the converted first text message.

6. The cordless telephone recited in claim 5, wherein stereo information is transmitted to a handset along with the converted first text message.

7. The cordless telephone recited in claim 5, further comprising a USB port through which the first text message in digital form is received.

8. The cordless telephone recited in claim 2, wherein stereo information is transmitted along with the converted first text message to the handset in a band having a frequency range below a band in which the text message is transmitted.

9. The cordless telephone recited in claim 1, wherein communication with the personal computer is in digital form.

10. The cordless telephone recited in claim 9, wherein stereo information is received from the personal computer and voice information is received by the base unit, and wherein both the stereo and voice is sent to a handset along with the converted first text message.

11. The cordless telephone recited in claim 1, wherein the two-way messaging session is an instant messaging session.

12. A method for carrying on two way text messaging session using a cordless telephone, comprising:
    receiving a first text message from a personal computer;
    converting the first text message for wireless transmission;
    transmitting the converted first text message to a handset associated with the cordless telephone;
    receiving the converted first text message in the handset;
    converting the converted first text message to a form suitable for display;
    displaying the displayable form of the converted first text message on a display on the handset;
    entering a second text message;
    displaying the second text message on the display on the handset;
    converting the second text message for wireless transmission to a base unit of the cordless telephone;
    transmitting the converted second text message;
    receiving the converted second text message; and
    converting the converted second text message for transmission to the personal computer.

13. The method recited in claim 12, wherein communication with the personal computer is in analog form.

14. The method recited in claim 13, wherein the converted first text message is in FSK-encoded format, and transmitted to the handset in an SCA channel.

15. The method recited in claim 13, wherein the converted second text message is transmitted to the base unit in FSK-encoded format in an SCA channel, and converted to a DTMF-encoded format for transmission to the personal computer.

16. The method recited in claim 13, further comprising transmitting stereo information to the handset along with the converted first text message.

17. The method recited in claim 12, wherein communication with the personal computer is in digital form.

18. The method recited in claim 17, wherein stereo information is transmitted to the handset along with the converted first text message.

19. The method recited in claim 17, wherein stereo information and voice information are transmitted to the handset along with the converted first text message.

20. A cordless telephone for carrying on two way text messaging session using a cordless telephone, comprising:
    means for receiving a first text message from a personal computer;
    means for convening the first text message for wireless transmission;
    means for transmitting the converted first text message to a handset associated with the cordless telephone;
    means for receiving the converted first text message in the handset;
    means for converting the converted first text message to a form suitable for display;
    means for displaying the displayable form of the converted first text message on a display on the handset;
    means for entering a second text message;
    means for displaying the second text message on the display on the handset;
    means for converting the second text message for wireless transmission to a base unit of the cordless telephone;
    means for transmitting the converted second text message;
    means for receiving the converted second text message; and
    means for converting the converted second text message for transmission to the personal computer.

21. The cordless telephone recited in claim 20, further comprising means for communicating with the personal computer over an analog data link.

22. The cordless telephone recited in claim 20, further comprising means for communicating with the personal computer over a digital data link.

* * * * *